United States Patent [19]

Moeller

[11] Patent Number: 5,061,912
[45] Date of Patent: Oct. 29, 1991

[54] WAVEGUIDE COUPLER HAVING OPPOSED SMOOTH AND OPPOSED CORRUGATED WALLS FOR COUPLING $HE_{1,1}$ MODE

[75] Inventor: Charles P. Moeller, Del Mar, Calif.
[73] Assignee: General Atomics, San Diego, Calif.
[21] Appl. No.: 557,480
[22] Filed: Jul. 25, 1990
[51] Int. Cl.$^5$ .............................................. H01P 5/18
[52] U.S. Cl. .................................... 333/113; 333/239
[58] Field of Search ............... 333/113, 114, 239, 252
[56] References Cited

U.S. PATENT DOCUMENTS

| | | |
|---|---|---|
| 2,746,036 | 5/1956 | Walker . |
| 2,852,752 | 9/1958 | McCreary ........................ 333/113 X |
| 2,871,452 | 1/1959 | Hewlett .............................. 333/113 |
| 2,960,670 | 11/1960 | Marcatili . |
| 3,016,495 | 1/1962 | Tien .................................. 333/113 X |
| 3,213,394 | 10/1965 | Liebscher et al. ................... 333/252 |
| 3,252,034 | 5/1966 | Preist et al. .......................... 313/107 |
| 3,257,620 | 6/1966 | Roberts ................................... 330/4 |
| 3,299,364 | 1/1967 | Buchmiller et al. ..................... 330/4 |
| 3,335,419 | 8/1967 | Wyble et al. .................... 333/252 X |
| 3,408,567 | 10/1968 | Kahn ..................................... 324/95 |
| 3,416,106 | 12/1968 | Webb . |
| 3,993,969 | 11/1977 | Gross . |
| 4,200,820 | 4/1980 | Symons et al. ......................... 315/4 |
| 4,210,845 | 7/1980 | Lebacqz .............................. 315/5.25 |
| 4,282,458 | 8/1981 | Barnett .................................. 315/4 |
| 4,286,239 | 8/1981 | Gross .................................. 333/245 |
| 4,297,662 | 10/1981 | Gross et al. .......................... 333/252 |
| 4,371,854 | 2/1983 | Cohn et al. .......................... 333/252 |
| 4,388,555 | 6/1983 | Symons et al. ......................... 315/4 |
| 4,460,846 | 7/1984 | Taylor et al. . |
| 4,523,127 | 6/1985 | Moeller . |

FOREIGN PATENT DOCUMENTS 986494  3/1965  United Kingdom ................. 333/252

OTHER PUBLICATIONS

Vlasov, S. N. "Open Coaxial Resonators for Gyrotrons," Radio Engineering and Electronic Physics, vol. 21, 1976, pp. 96–102.

Flyagin, V. A., et al., "The Gyrotron," IEEE Transactions on Microwave Theory & Techniques, vol. MTT-25, No. 6, Jun. 1977, pp. 514–521.

Hirshfield, J. L., et al., "The Electron Cyclotron Maser-An Historical Survey," IEEE Transactions on Microwave Theory and Techniques, vol. MTT-25, No. 6, Jun., 1977, pp. 522–527.

Marcuvitz, N., Waveguide Handbook, McGraw-Hill, 1951, pp. 72–80.

Miller, S. E., "Coupled Wave Theory and Waveguide Applications," The Bell System Technical Journal, May, 1954, vol. 33, pp. 661–719.

Crompton, J. W., "A Contribution to the Design of Multi-Element Directional Couplers," Proccedings of the IEEE, vol. 104C, 1957, pp. 398∝402.

Symons, Robert S., et al., "An Experimental Gyro-TWT," Transactions on Microwave Theory & Techniques, vol. MIT-29, No. 3, Mar., 1981, pp. 181–184.

Baird, J. Mark, "Survey of Fast Wave Tube Developments," Techical Digest of International Electron Devices Meeting Sponsored by IEEE, Washington, D.C., 1979, pp. 156–163.

Ganguly, A. K., et al., "Analysis of Two-Cavity Gyroklystron," Int. J. Electronics, 1981, vol. 51, No. 4, pp. 503–520.

Ganguly, A. K., et al., "Self-Constitent Large Signal Theory of the Gyrotron Travelling Wave Amplifier," Int. J. Electronics, 1982, vol. 53, No. 6, pp. 641–658.

J. L. Doane, International Journal of Infrared and Millimeter Waves, vol. 8, p. 13, (1987).

*Primary Examiner*—Paul Gensler
*Attorney, Agent, or Firm*—Fitch, Even, Tabin & Flannery

[57] ABSTRACT

Apparatus for generating high power microwaves and for radiating the microwave power in the $HE_{1,1}$ mode into a confined plasma is disclosed. The apparatus includes a microwave generator and mode converters to convert the generated microwave power into the rectangular $HE_{1,1}$ mode. An hermetically sealed rectangular $HE_{1,1}$ mode power coupler is used between the plasma and a main waveguide run to seal the main waveguide run and the generator from the plasma. The power coupler comprises an input rectangular $HE_{1,1}$ mode waveguide, an output rectangular $He_{1,1}$ mode waveguide and a plurality of dielectric sealed apertures through a common wall between the input and output waveguides. Power absorbed by the power coupler is removed by cooling fluid which is circulated through the common wall between the apertures.

14 Claims, 3 Drawing Sheets

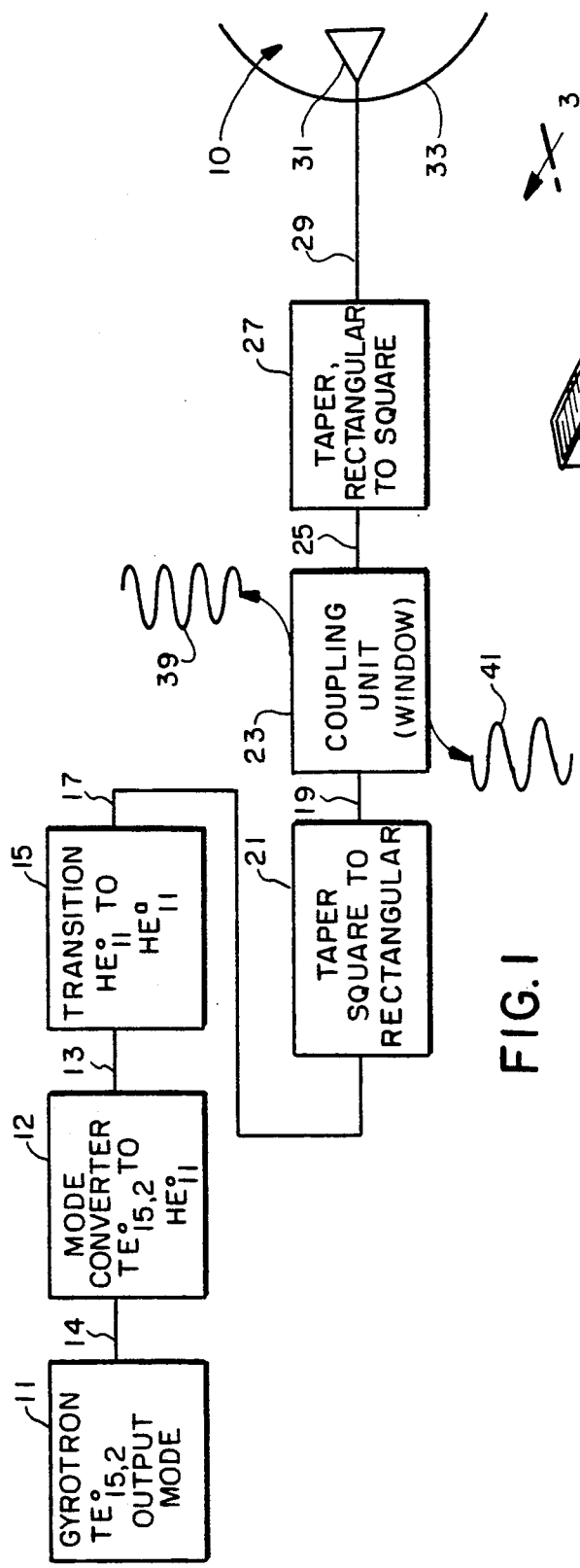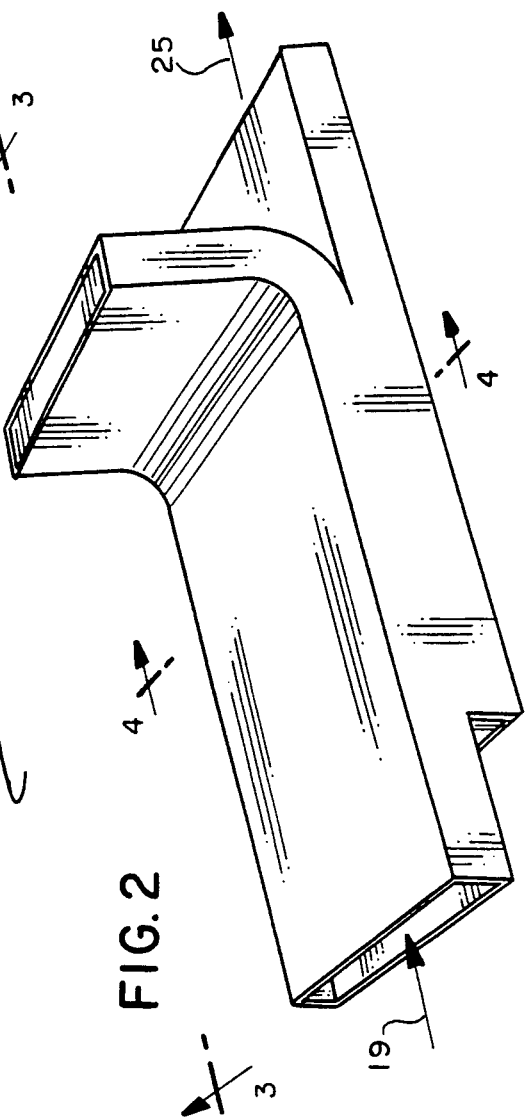

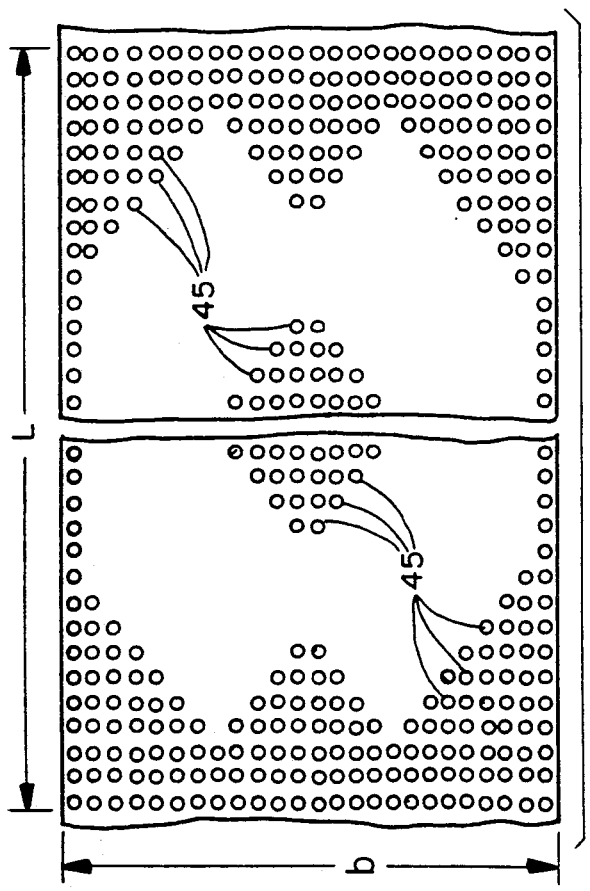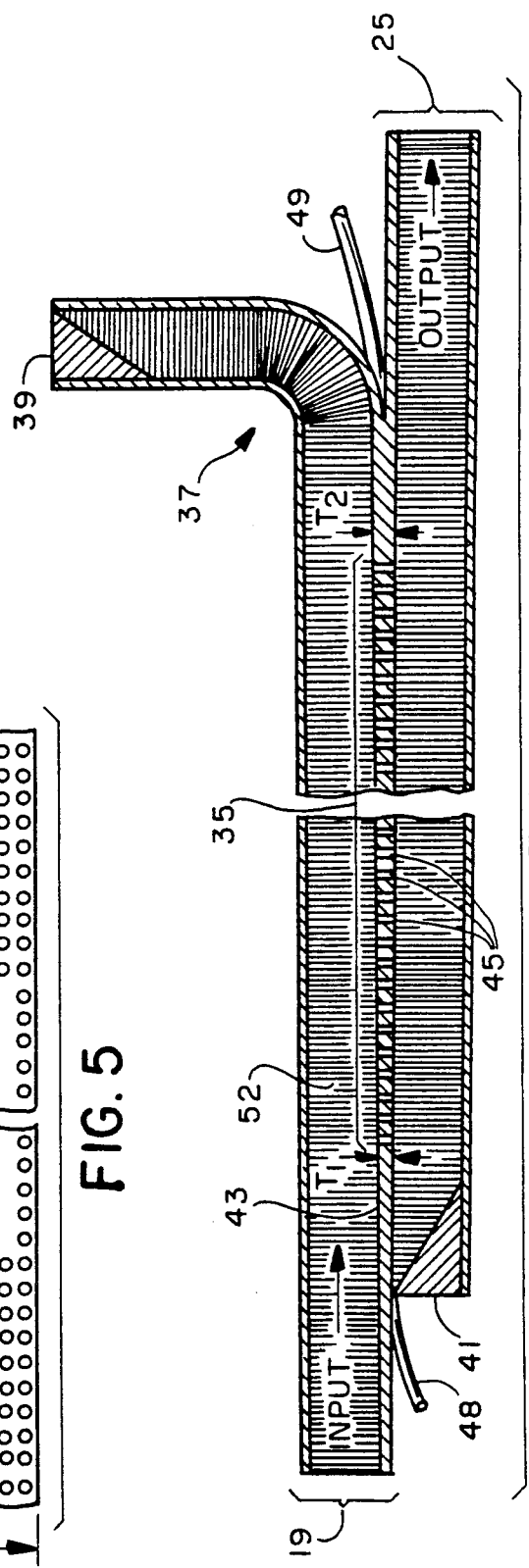

WAVEGUIDE COUPLER HAVING OPPOSED SMOOTH AND OPPOSED CORRUGATED WALLS FOR COUPLING $HE_{1,1}$ MODE

BACKGROUND OF THE INVENTION

1. Field of the Invention

This invention relates to microwave waveguides and more particularly, to coupling windows in such waveguides which are capable of propagating high frequency, high power microwave power without overheating, significant mode conversion, or excessive sensitivity to frequency.

2. Description of the Prior Art

A waveguide window in a microwave power system generally permits power to pass from one waveguide to a second waveguide, but presents a physical barrier between the two waveguides. The waveguides may contain different gases or have different pressure levels, and one or both waveguides may be evacuated. For example, in high power microwave vacuum devices, such as gyrotrons and the like, power is generally transferred between an evacuated chamber or waveguide in the device and a waveguide having a gaseous environment through one or more waveguide windows which provide a hermetic seal between the two media. Also, in fusion reactors where microwave power in the $HE_{1,1}$ mode is added to a plasma, such a barrier is desirable near the reactor to confine the constituents of the plasma.

A window of the prior art may consist of a dielectric disk secured in a waveguide. At low frequencies and low power, the heat generated due to inherent dielectric loss may be dissipated by cooling the edge of the disk. However, for a given material, frequency and temperature rise, there is an absolute limit on the allowable power, independent of window size. This limit drops rapidly with increasing frequency. If the additional heat is not adequately dissipated, the window may overheat and fail.

Another known window has a pair of disks with a dielectric liquid flowing between them for cooling. At high frequency or high power, the coolant flow rate must increase, which requires increased pressure and thicker disks to withstand the pressure. The increased thickness of the window further increases the total dissipation. If the disks become several wavelengths thick, they become very frequency sensitive, particularly when used in microwave tubes, and sensitive to variations in the dielectric constant of the disk material. In addition, the heat transfer through the thick disks is poor.

A plurality of apertures in a common wall can be used for transferring microwave power between waveguides having equal phase velocities as discussed in S. E. Miller, Coupled Waveguide Theory and Application Bell System Tech. J., May 1954, p. 661-719. Since the power through each coupling aperture can be made small, if dielectric plugs are used to seal each aperture, the plugs may be edge cooled, and the plurality of apertures may transfer high power in the megawatt range. However, at the frequencies and powers of interest here, the waveguides must be over moded to have acceptably low loss; that is, many modes can propagate in the waveguides, and generally efficient transfer of power between waveguides requires a highly symmetric geometry.

A coupling apparatus using a plurality of relatively small apertures is disclosed in C. P. Moeller, U.S. Pat. No. 4,523,127. The described apparatus is constructed of a first cylindrical waveguide having a second cylindrical waveguide mounted coaxially therein forming an inner cylindrical waveguide and an outer coaxial waveguide. The inner waveguide has a plurality of apertures about its surface for coupling microwave power between the inner (cylindrical) and outer (coaxial) waveguides. This arrangement has the required azimuthal symmetry, but the different cross-sectional types (cylindrical and coaxial) of the two circular waveguides makes phase velocity matching difficult as a practical matter because the apertures tend to perturb the two waveguides dissimilarly. Also, the only low loss modes suitable for this geometry, the circular $TE_{o,n}$ modes, require further conversion to the $HE_{1,1}$ mode before the power is launched into a plasma.

It is frequently desirable to add power to a plasma by radiating high power microwaves into that plasma. The $HE_{1,1}$ mode has low loss and an ideal radiation pattern for launching high power microwaves at high frequencies into a plasma. To be propagated in circular waveguide, the $HE_{1,1}$ mode requires corrugations around the inner surface of the waveguides. These corrugations interfere, however, with the wall currents which provide the coupling when apertures are introduced between two waveguides. As disclosed in J. L. Doane Int. Journal of Infrared and Millimeters Waves, Vol. 8, p. 13 (1987), $HE_{1,1}$ mode waves can be conveyed with low loss in rectangular waveguides comprising two opposed corrugated surfaces and two smooth surfaces. No coupling window is known, however, for efficiently coupling $HE_{1,1}$ mode microwaves between waveguides using phase velocity coupling.

A need exists for a waveguide coupling apparatus to couple $HE_{1,1}$ mode microwaves between a pair of waveguides at high power levels which apparatus avoids mode conversion and exhibits substantially the same phase velocity in both coupled waveguides.

SUMMARY OF THE INVENTION

The present invention is based on the discovery of a way to utilize small aperture coupling in a manner permitting coupling between waveguides operating in the $HE_{1,1}$ mode by adapting waveguides of the sort described by Doane. A coupling apparatus in accordance with the present invention comprises a pair of substantially identical rectangular waveguides, each having a pair of opposed smooth surfaces separated by a distance a and a pair of opposed corrugated surfaces separated by a distance b. The combination of opposed smooth surfaces and opposed corrugated surfaces provides low loss propagation of $HE_{1,1}$ mode microwave power. One of the smooth surfaces of each waveguide is separated from a smooth surface of the other by a common wall. A coupling region comprising a plurality of small apertures is fabricated through the common wall between the waveguides. The use of substantially identical waveguides automatically matches their phase velocities and the use of a plurality of small apertures through the smooth surfaces improves coupling mode selectivity and makes high power coupling possible.

In a preferred embodiment, the waveguides are substantially aligned on opposite sides of the common wall and the apertures are hermetically sealed with a dielectric such as sapphire. Multiple apertures provide good power handling capability through the coupling region and also permit control over the size and shape of the coupling region to limit mode conversion and maximize transmission of the desired mode. Advantageously, the apertures of the coupling region are placed in a rectangular array of a plurality of rows of apertures where each row is substantially perpendicular to the corrugated waveguide surfaces and comprises a number of apertures $N \geq b\sqrt{3}/a$.

The disclosed coupling apparatus receives at an input waveguide approximately 1 megawatt of power in the $HE_{1,1}$ mode at a frequency f of 110 gigahertz, which corresponds to a free space wavelength $\lambda$ of 2.73 millimeters. In order to limit the presence of other modes, the dimension a between the smooth surfaces of each of the coupled waveguides can be as small as $2\lambda$ without making the waveguide losses excessive. In order to limit the coupling of modes other than $HE_{1,1}$, the spacing of apertures in the rows transverse to the waveguide axis and perpendicular to the corrugated surfaces of the waveguides is chosen to be less than $2\lambda/\sqrt{3}$. The selection of spacing between the rows of apertures limits the possibility of back-scattering radiation. Advantageously, the rows are separated by a distance less than $\lambda/2$ and in a preferred embodiment are separated by approximately $\lambda/3$.

The overall length of the coupling region in the preferred embodiment is designed to enhance the coupling of $HE_{1,1}$ mode waves and suppress the coupling of other modes. Modes higher than $HE_{1,1}$ are suppressed by making the length of the coupling region sufficiently long that higher modes in the output waveguide get at least $4\pi$ out of phase with the $HE_{1,1}$ mode in the input waveguide.

In a preferred embodiment each of the sapphire filled apertures absorbs approximately 1½ percent of the power transmitted through it. For the conveyance of approximately 1 megawatt of power, this results in the absorption in the coupling region of approximately 15,000 watts. The area of the coupling region in a preferred embodiment is approximately 140 square centimeters yielding a power absorption of approximately 110 watts per square centimeter. Cooling tubes are run through the common wall to dissipate this power from the coupling region.

BRIEF DESCRIPTION OF THE DRAWINGS

FIG. 1 is a block diagram of apparatus utilizing an embodiment of the present invention;

FIG. 2 is an exterior structural view of one embodiment of the coupling unit of FIG. 1;

FIG. 5 is a plan view of the coupling region formed in an inner smooth surface of the coupling unit shown in FIG. 2; and FIG. 6 is a side view cross section of an alternative embodiment of the coupling unit taken along line 3—3 in FIG. 2.

DETAILED DESCRIPTION OF THE PREFERRED EMBODIMENT

Figure 3:
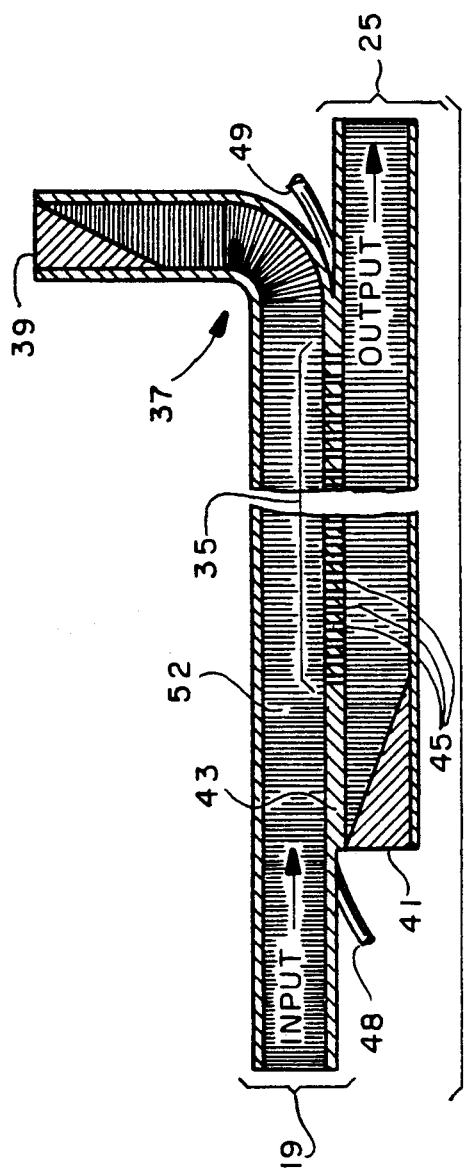
FIG. 3 is a side view cross section of the coupling unit taken along line 3—3 shown in FIG. 2.

FIG. 1 is a block diagram of apparatus used to deliver microwave power to a plasma 10 contained in a containment vessel 33. In the present embodiment, approximately 1 megawatt of power at 110 gigahertz is to be delivered to the plasma 10. The apparatus for delivering this power includes a power source 11 which may comprise a gyrotron, generating approximately 1 megawatt of output power at 110 gigahertz in the $TE_{15,2}$ mode. The power is conveyed in a smooth walled circular waveguide 14 to a known mode converter 12 which converts the power to the $HE_{1,1}$ mode. The $HE_{1,1}$ mode is used because it provides a good radiation pattern with low side lobes and cross-polarization, can be matched well with a gaussian beam and is easily coupled to the plasma 10. The mode converter 12, transmits the power it receives in a circular, corrugated waveguide 13, which constitutes the main waveguide run, to a transition unit 15 which converts the received power to an $HE_{1,1}$ square mode in a square waveguide 17, which is tapered into a rectangular waveguide 19 by a tapered waveguide 21. The circular waveguide is chosen for the main run because of its lower cost relative to that of square or rectangular waveguide.

The square, rectangular and tapered waveguides 17,19,21 have two opposed corrugated surfaces and two opposed smooth surfaces. The use of square and rectangular waveguides for conveying $HE_{1,1}$ mode power and tapering between different geometric shapes of waveguides is discussed by J. L. Doane in Int. Journal of Infrared and Millimeter Waves, Vol. 8, p. 13 (1987).

The rectangular waveguide 19 delivers microwave power to a coupling unit 23, which couples incoming power to an outgoing rectangular waveguide 25 in the $HE_{1,1}$ mode. The rectangular waveguide 25 is like the waveguide 19 and is tapered back to a square waveguide 29 by the operation of a tapered waveguide 27. The power is radiated from the square waveguide 29 to the plasma 10 via a corrugated horn 31.

The corrugated horn 31, and thus, the wave coupling apparatus of FIG. 1, is potentially exposed to the plasma 10. In the present embodiment, the plasma 10 typically contains tritium which is hazardous to human operators and should be isolated from the atmosphere. Accordingly, it is necessary to seal the waveguide apparatus of FIG. 1 so that tritium contained by plasma 10 does not get beyond the plasma containment vessel and the sealed section or the waveguide. The coupling unit 23 efficiently couples the $HE_{1,1}$ mode power from the waveguide 19 to the waveguide 25 and provides an hermetic seal between these two waveguides, thereby confining any of the products of the plasma to the waveguide sections between the coupling unit 23 and the plasma 10.

FIG. 2 is an exterior structural representation of a preferred embodiment of the coupling unit 23. Input power arrives at the coupling unit in the rectangular waveguide 19, is coupled through an hermetically sealed coupling region (not shown in FIG. 2) and exits the coupling unit in the rectangular waveguide 25 in the direction shown.

FIG. 3 is a cross section along the longitudinal axis of the coupling unit 23 of FIG. 2 and shows the incoming rectangular waveguide 19 and the outgoing rectangular waveguide 25. Within the coupling unit 23, the waveguides 19 and 25 share a common wall 43, the opposite smooth surfaces of which form inner smooth surfaces of the two waveguides 19 and 25. A coupling region 35 is shown between the waveguides 19 and 25 which comprises a plurality of apertures 45 through the common wall 43. In the illustrated preferred embodiment of the present invention, each of the apertures 45 is sealed with a dielectric such as sapphire.

The waveguide 19 comprises a bend 37 and a high power load 39. Since power in the range of one megawatt is being conveyed in the coupled waveguides, even very small percentages of noncoupled power can be large in magnitude. For example, if five percent of the power is not coupled by region 35 from the waveguide 19 to the waveguide 25, 50 kilowatts of power remain uncoupled and must be dissipated by the high power load 39. For this reason, the bend 37 is employed so that sufficient space is available for a physically large load appropriate for that power. A low power load 41 is used in the waveguide 25 to dissipate any power which is coupled into the waveguide 25 with a velocity in the reverse direction of the horn 31 (FIG. 1).

Figure 4:
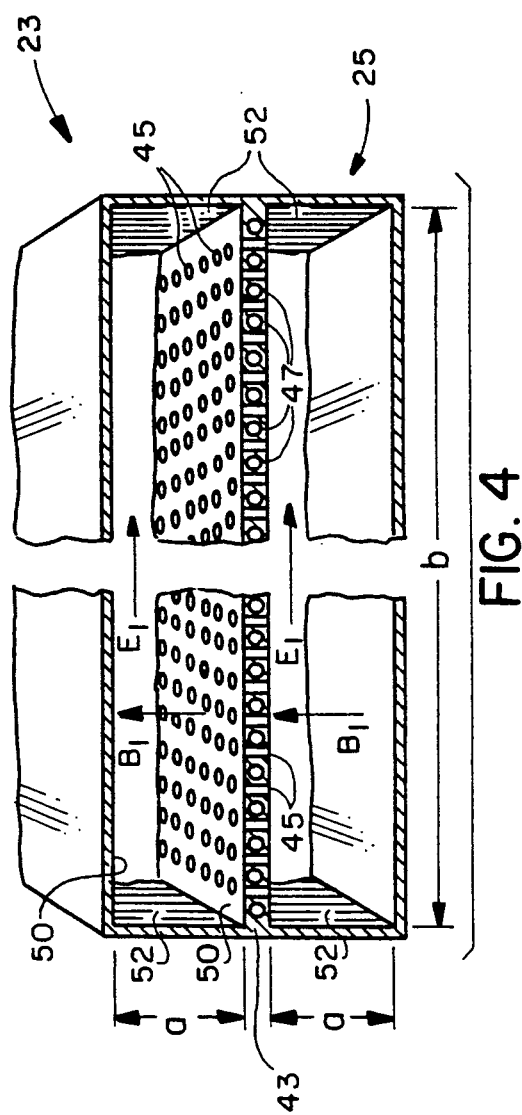
FIG. 4 is a perspective view from a cross section of the coupling unit taken along line 4—4 in FIG. 2.

FIG. 4 represents a perspective view into the waveguides 19 and 25 at a cross section taken normal to the longitudinal axis of these waveguides. Each of the waveguides 19,25 comprises a hollow region defined by a pair of opposed smooth surfaces 50 and a pair of opposed corrugated surfaces 52. The surfaces 50 are substantially parallel to one another at the distance a, and the surfaces 52 are substantially parallel to one another at the distance b. By the operation of the transition unit 15 and the taper unit 21, the electric field E is perpendicular to the corrugated surfaces 52 and the magnetic field B is perpendicular to the smooth surfaces 50.

The corrugated surfaces 52 are created by etching or scoring grooves into the sidewalls. In the present embodiment, the grooves are $\lambda/4$ deep and are spaced along the surface with a $\lambda/4$ spacing between groove centers. The free space wavelength $\lambda$ of electromagnetic radiation at 110GHz is approximately 2.73 mm. so that $\lambda/4$ is approximately equal to 0.68 mm.

The coupling apertures 45 can be seen in FIG. 4 extending from the input waveguide 19 to the output waveguide 25. Cooling channels 47 are provided in the present embodiment and run longitudinally through common wall 43 between the coupling apertures 45. The cooling channels 47 communicate with a cooling fluid inlet 48 and a outlet 49 (FIG. 3) for the passage of coolant to control the temperature in the coupling region 35.

The waveguides 19 and 25 are rectangular in cross section with cross section dimensions a by b. Within the waveguides 19 and 25 the transverse field components are given by equation (1):

$$E_y \propto B_x \propto \sin(m\pi x/a) \sin(n\pi y/b) \quad (1)$$

where $E_y$ is the transverse electric field, $B_x$ is the transverse magnetic field, m is the number of half cycles along the dimension a, n is the number of half cycles along the dimension b, x is the distance along dimension a and y is the distance along dimension b. The cutoff wave numbers $k_c$ of waveguides 19 and 25 are given by equation (2):

$$k_{c\,m,n}^2 = (m\pi/a)^2 + (n\pi/b)^2 \quad (2)$$

It is possible for the rectangular waveguides 19 and 25 to convey many modes. In order to limit the number of modes possible in the waveguides, the dimension a has been chosen to be approximately equal to $2\pi$, which is sufficiently large to give negligible ohmic losses, but limits propagation to modes where m=1, 2 and 3. In the present embodiment, the source frequency f of 110 gigahertz corresponds to a free space wavelength $\lambda$ of approximately 2.73 millimeters, and accordingly dimension a is approximately 5.46 millimeters. The dimension b has been chosen to be 100 mm. for power density considerations, discussed below.

FIG. 5 is a representation of the coupling region 35 in plan view showing a rectangular array of apertures 45 through the common wall 43. Region 35 has a length L along the longitudinal axis of the waveguides 25 and 19, and a width b of the common wall 43 surface of each of those waveguides. The length L of the coupling region is chosen so that modes higher than $HE_{1,1}$ in the output waveguide 25 are at least $4\pi$ out of phase with the $HE_{1,1}$ mode in the input waveguide in order to suppress the coupling of these higher modes. The minimum length of the coupling region 35 can thus be determined by making the difference between the axial wave number of the $HE_{1,1}$ mode and the next higher mode, $HE_{2,1}$, greater than or equal to $4\pi/L$. The length L is determined by equation (3):

$$L \geq \frac{4\pi}{|k_{z1,1} - k_{z2,1}|} \quad (3)$$

where the axial wave number $k_z$ of the represented modes is determined by equation (4):

$$k_{z\,m,n} = \left[\left(\frac{2\pi f}{c}\right)^2 - (m\pi/a)^2 - (n\pi/b)^2\right]^{\frac{1}{2}} \quad (4)$$

where c is the speed of light. For $HE_{1,1}$ and $HE_{2,1}$ mode waves, equations (3) and (4) yield a length L for the coupling region of at least 5.35 centimeters at a frequency f of 110 gigahertz.

The direction of coupling is periodic as a function of the product of a coupling strength factor and the length of the coupling region. Maximum coupling to the output waveguide occurs when the product of coupling length and coupling strength, in radians, is on odd multiple of $\pi/2$. The coupling strength factor for a given waveguide coupling window can be determined empirically. Upon determining the coupling strength factor, the length of the coupling region can be calculated to produce the desired coupling amount and direction. In the present embodiment the coupling region length is 14 cm. The previously discussed article by S. E. Miller, describes coupling between waveguides including the periodicity of coupling direction.

Control of the number of apertures across the waveguide width b is also important to limiting the coupling to the $HE_{1,1}$ mode. If there are N rows of apertures 45 equally spaced over the distance b, then not only would the $HE_{1,1}$ mode be coupled to the $HE_{m,1}$ modes, but also to $HE_{m,n}$ modes for n=1, $n = 1 \pm N$, $1 \pm 2N$, etc. For example, if ten rows of apertures 45 are placed across the coupling region 35, N=10 and the $HE_{m,9}$, $HE_{m,11}$, $HE_{m,19}$ and $HE_{m,21}$, etc., would all be generated in the output waveguide by the $HE_{1,1}$ mode in the incoming waveguide. It has been discovered, however, that as long as the number of apertures N across the width b is chosen so that N/b is greater than or equal to $\sqrt{3}/a$, the $(n\pi/b)$ term in equations (2) and (4) is of sufficient magnitude that the coupling region L need be no longer than needed for discriminating against the nearest axial mode ($HE_{2,1}$) as discussed above, namely 5.35 centimeters.

The axial spacing of apertures along the length L should also be considered. Unless there are more than two apertures per wavelength, backscattering will occur. In the present embodiment, an axial spacing of approximately 1 millimeter between apertures is used to provide nearly three apertures per wavelength. This is a conservative design.

The apertures are each a right circular cylindrical volume which is hermetically sealed by brazing a cylindrical dielectric therein. In the present embodiment, sapphire, having a dielectric constant $\epsilon=9$, has been used as the dielectric. Each of the hermetically sealed apertures comprises a small waveguide which propagates the circular $TE_{1,1}$ mode, its lowest mode, but preferably does not propagate higher modes. The radius r of each aperture below which a given mode cannot propagate is given by equation (5):

$$r = \frac{P}{2\pi f} \frac{c}{\sqrt{\epsilon}} \qquad (5)$$

where P satisfies $J'_m(P)=0$ when the given mode is a TE mode and P satisfies $J_m(P)=0$ when the given mode is a TM mode. $J_m$ is the Bessel function of order m, $J'_m$ is the derivative of $J_m$, m is the angular mode number of the mode, f equals the frequency of interest (110 gigahertz) and $$\frac{c}{\sqrt{\epsilon}}$$

is the velocity of the wave in the dielectric. For example, with respect to the aperture, the next mode higher than the $TE_{1,1}$ mode is the $TM_{0,1}$ mode, for which $P=2.405$ as determined from a table of Bessel roots. Equation (5) indicates that for $\epsilon=9$, the $TM_{0,1}$ mode will not propagate when r is less then 0.35 millimeters. However, due to the symmetry of the $TM_{0,1}$ mode, its excitation is unlikely. The next higher mode to be suppressed is the $TE_{2,1}$ mode, with $P=3.054$. Equation (5) indicates that the aperture radius must be less than 0.44 millimeters for the $TE_{2,1}$ mode to be cut off. The 0.88 mm diameter is consistent with the axial spacing of 1 mm. given above.

The length of the dielectric-filled apertures is selected to be a multiple of one-half of the wavelength of the microwaves in the dielectric. The wavelength of 110 gigahertz $HE_{1,1}$ mode waves in sapphire having a dielectric constant of 9 is approximately 0.909 millimeters. To provide a reasonable thickness for the common wall 43, while at the same time limiting the power dissipation in the dielectric inserts, their length (and thus the thickness of the common wall), is selected in the present embodiment to be six wavelengths in the sapphire or approximately 5.45 millimeters.

The preceding description sets forth a number of maxima and minima which represent design constraints on the waveguides 19 and 25 and the coupling region 35. FIG. 5 represents the structure of the coupling region designed in accordance with these constraints. The coupling region has a dimension L equal to 140 millimeters and a dimension b equal to 100 millimeters. 140 apertures, separated on center by approximately 1 millimeter, lie along each axial column of apertures. 30 apertures make up each transverse row, yielding an aperture spacing in the transverse direction of approximately 3.33 millimeters on center. Each of the apertures comprises a dielectric cylinder through the common wall 43 having a radius of approximately 0.44 millimeters. Accordingly, there are 4,200 apertures and dielectric inserts in the coupling region 35.

The array of apertures can be fabricated by using well-known, numerically-controlled machine tool techniques to drill the apertures, through a common wall which is slightly in excess of the 5.45 millimeter thickness discussed above. The cylindrical inserts are ground to the appropriate radius, metallized, cut to nominal lengths and brazed into the common wall. After insert brazing, the faces of the common wall, including the sapphire inserts, are ground as a unit to the specified thickness of 5.45 mm.

Given the large amount of power to be conveyed through the coupling region 35, power considerations are important to the design for a one megawatt input. Assuming a sinusoidal distribution of transmitted power, both axially and transversely, the average power transmitted per window is 250 watts, but the worst case would be approximately 1,000 watts at certain apertures. Sapphire, can easily handle the peak power. Each sapphire insert, however, will incur a power loss of approximately 3 percent per centimeter of length. Because the length of the inserts is approximately ½ centimeter, this represents a loss to heat of approximately 1.5% of the power coupled. When coupling one megawatt of power, approximately 15 kilowatts would be absorbed in the coupling region 35. Given the size of the coupling region chosen (area=140 cm²), the heat to be dissipated from the coupling region is less than 110 watts per cm², which is easily cooled by the coolant channels 47 running between the apertures through common wall 43.

The optimum frequencies for conveying power through apertures 45 are frequencies which correspond to multiples of the half wavelength of the dielectric. In the preceding embodiment all apertures 45 are of the same length and optimally couple the same frequencies. Providing a range of aperture lengths provides a range of frequencies optimally conveyed by the coupling region. Such a frequency range is desirable when the coupling window is used with a source, such as a step tunable gyrotron, which is capable of producing microwaves at different frequencies.

FIG. 6 shows an alternative embodiment to the coupler unit shown in FIG. 3 in which the thickness of common wall 43 and thus the aperture length is not constant, but varies linearly over the length of the coupling region. Such variation can improve the mode discrimination of the coupling region and can increase the bandwidth of the excitation frequencies coupled. In FIG. 6 the common wall 43 varies linearly from a thickness $T_1$ to a thickness $T_2$ along the coupling region 35 resulting in waveguides 19 and 25 that are not parallel, but instead meet at an angle. The angle at which the waveguides meet is exaggerated in FIG. 6 for ease of visualization.

For coupled frequencies in the range of 110 gigahertz, distance $T_1$ is made approximately 5.24 millimeters and distance $T_2$ is made approximately 5.7 millimeters. This range of distances $T_1$ and $T_2$ includes the 5.45 millimeters of the prior embodiment. Each aperture in this coupling region is to some extent a bandpass coupler wherein the coupling peaks at each half wavelength of the excitation frequency. To provide a large overall bandwidth, distances $T_1$ and $T_2$ are selected so that the range of frequencies corresponding to a multiple of one half the dielectric wavelengths for all the apertures between $T_1$ and $T_2$ overlaps the range of frequencies for the next higher multiple of one half wavelength. For example, when $T_1=5.24$ mm and $T_2=5.7$, coupling peaks occur at 6 times the excitation wavelength from 105.5 to 114.5 gigahertz along the coupling region. 105.5 gigahertz is approximately 96% of 110 gigahertz and 114.5 is approximately 104%. Similarly, coupling peaks occur for 6.5 times the excitation wavelengths from 114.3 to 124 gigahertz. Since these ranges of coupling peaks overlap (114.5 gigahertz is greater than 114.3) an extended range of frequencies can be coupled efficiently.

The advantages of this invention are now apparent. The substantially identical shapes of the waveguides and the symmetrical distribution of apertures maintain mode purity, and the relatively short length of the dielectric inserts reduces frequency sensitivity and dielectric losses. The inserts may be adequately cooled by coolant in the coolant channels. There is also no problem with reflection of power back to the generator, as with a mismatched conventional window, since with the present invention, uncoupled power is absorbed in the load 39 of FIGS. 3 and 6.

While the principles of the invention have been described above in connection with specific apparatus and applications, it is to be understood that this description is made only by way of example and not as a limitation on the scope of the claims of this invention.

What is claimed is:

1. Coupling apparatus for coupling microwave power between the $HE_{1,1}$ mode in a first wave guide and the $HE_{1,1}$ mode in a second waveguide, said apparatus comprising:

first waveguide means and second waveguide means, each of said waveguide means comprising a hollow volume of substantially rectangular cross section formed by a pair of opposed corrugated surfaces separated by a substantially uniform distance b and a pair of opposed smooth surfaces separated by a substantially uniform distance a, said distance a being less than said distance b, one of said smooth surfaces of said first waveguide means and one of said smooth surfaces of said second waveguide means being opposed surfaces of a common wall between said first waveguide means and said second waveguide means, said first waveguide means and said second waveguide means being substantially aligned on opposite sides of said common wall;

said common wall having a plurality of apertures therethrough between said first waveguide means and said second waveguide means for coupling microwave power between said first waveguide means and said second waveguide means, each of said apertures being small compared to the distances a and b; and a plurality of dielectric inserts disposed within respective ones of said apertures for hermetically sealing said first waveguide means from said second waveguide means.

2. The apparatus of claim 1 wherein said opposed surfaces of said common wall are substantially parallel to one another.

3. The apparatus of claim 1 wherein the distance between said opposed surfaces of said common wall varies in the vicinity of said apertures such that the length of said apertures varies to extend the range of frequencies conveyed by said coupling region.

4. The apparatus of claim 3 for coupling microwave power at a range of frequencies centered about a frequency f wherein the distance between said opposed surfaces of said common wall varies from a minimum distance which is approximately equal to a selected integer I times one-half the wavelength of a frequency 1.04 f in said dielectric, to a maximum distance which is approximately equal to I times one-half the wavelength of a frequency 0.96 f in said dielectric.

5. The apparatus of claim 1 wherein said apertures are disposed in a rectangular array comprising a plurality of rows of apertures, wherein each of said rows is substantially perpendicular to said corrugated surfaces of said first waveguide and comprises N apertures, where N is selected in accordance with the equation $N \geq b\, (\sqrt{3}/a)$.

6. The apparatus of claim 1 for coupling microwave power at a frequency f having a free space wavelength $\lambda$ wherein said opposed surfaces of said common wall are substantially parallel and the distance between said opposed surfaces of said common wall is substantially equal to a multiple of one half of the wavelength of said microwave power at said frequency f in said dielectric inserts.

7. The apparatus of claim 1 for coupling microwave power having a free space wavelength $\lambda$ wherein said distance a is less than or equal to $2\lambda$.

8. The apparatus in accordance with claim 7 wherein said apertures are disposed in a rectangular array comprising a plurality of rows of apertures, wherein each of said rows is substantially perpendicular to said corrugated surfaces of said first waveguide and wherein the spacing between adjacent rows is less than $\lambda/2$.

9. The apparatus of claim 7 wherein said apertures are disposed in rectangular array comprising a plurality of rows of apertures, wherein each of said rows is substantially perpendicular to said corrugated surfaces of said first waveguide and comprises N apertures and wherein N is selected in accordance with the equation $N \geq b\, (\sqrt{3}/2\lambda)$.

10. The apparatus of claim 9 wherein said plurality of rows of apertures are substantially equally spaced along a distance L selected in accordance with $$L \geq \frac{4\pi}{|k_{z1,1} - k_{z2,1}|}$$

where $k_{z\,1,1}$ is the axial wave number of $HE_{1,1}$ mode waves given by $$k_{z1,1} = \left[\left(\frac{2\pi f}{c}\right)^2 - \left(\frac{\pi}{a}\right)^2 - \left(\frac{\pi}{b}\right)^2\right]^{\frac{1}{2}}$$

where c=the speed of light and where $k_{z\,2,1}$ is the axial wave number of $HE_{2,1}$ mode waves given by $$k_{z2,1} = \left[\left(\frac{2\pi f}{c}\right)^2 - \left(\frac{2\pi}{a}\right)^2 - \left(\frac{\pi}{b}\right)^2\right]^{\frac{1}{2}}.$$

11. The apparatus of claim 1 wherein each of said apertures is circularly cylindrical and propagates power between said first waveguide means and said second waveguide means in the circular $TE_{1,1}$ mode.

12. The apparatus of claim 11 for coupling microwave power at a frequency f wherein said apertures have a radius r satisfying:

$$r < \frac{(3.054)}{2\pi f} \frac{c}{\sqrt{\epsilon}}$$

where $c/\sqrt{\epsilon}$ is equal to the velocity microwave power in said dielectric insert of dielectric constant $\epsilon$ disposed within said apertures.

13. The apparatus of claim 11 for coupling microwave power at a frequency f wherein said apertures have a radius r satisfying:

$$r < \frac{(2.405)}{2\pi f} \frac{c}{\sqrt{\epsilon}}$$

where $c/\sqrt{\epsilon}$ is equal to the velocity of said microwave power in said dielectric insert of dielectric constant $\epsilon$ disposed within said apertures.

14. The apparatus of claim 1 wherein said common wall comprises a plurality of channels disposed between said apertures for conveying cooling fluid.

* * * * *